Patented July 1, 1952

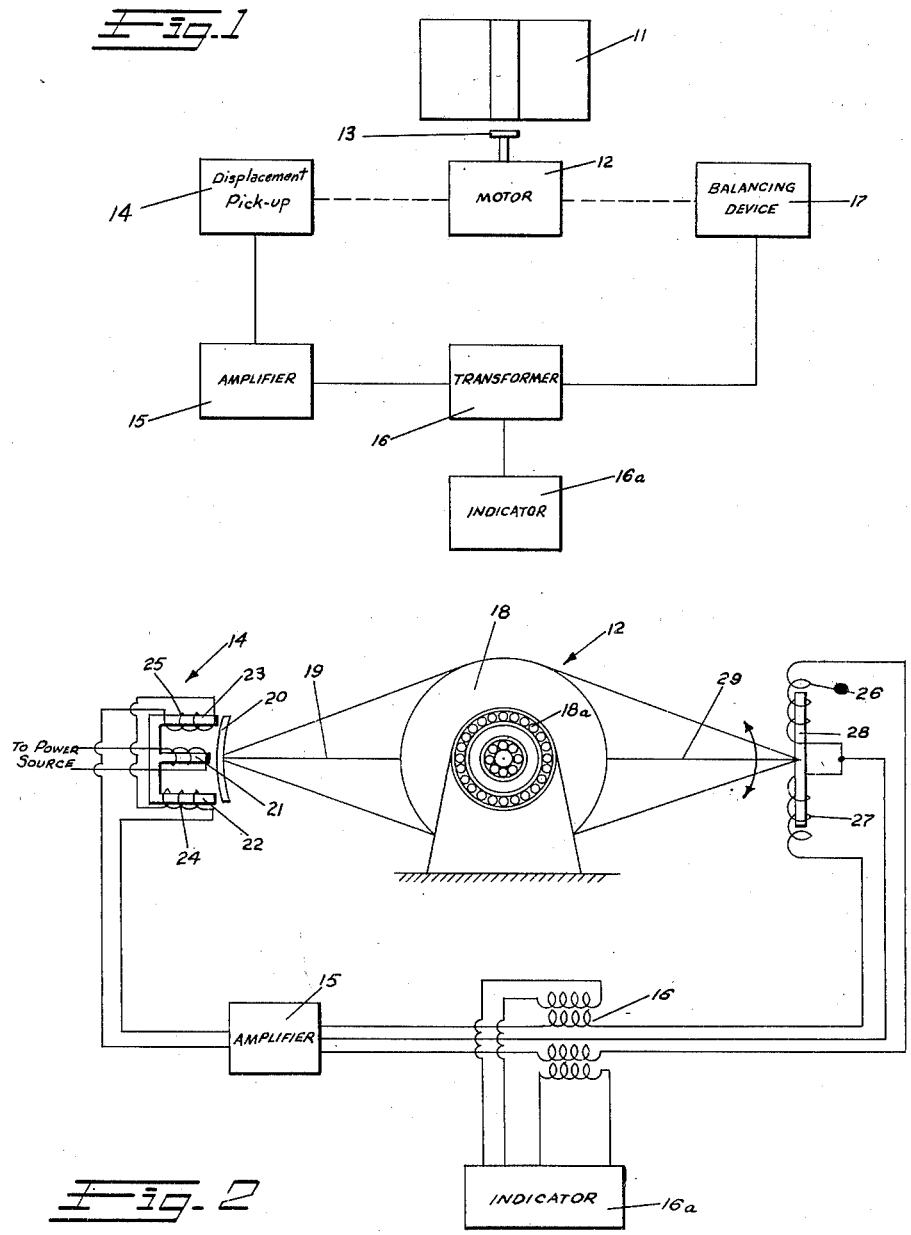

2,601,780

UNITED STATES PATENT OFFICE 2,601,780

DYNAMOMETRIC APPARATUS

Bernard J. Baecher, New York, N. Y.

Application August 18, 1945, Serial No. 611,428

5 Claims. (Cl. 73—136)

(Granted under the act of March 3, 1883, as amended April 30, 1928; 370 O. G. 757)

This invention relates to dynamometric apparatus.

An object of this invention is to provide apparatus for automatically indicating the torque output of a driving unit, such as a motor.

Another object is to provide apparatus for automatically indicating the torque demand of a driven unit such as a generator.

A further object is to provide an electronic system for automatically indicating the torque output of a driving unit or the torque demand of a driven unit.

Further objects and advantages of this invention, as well as its construction, arrangement and operation, will be apparent from the following description and claims in connection with the accompanying drawing, in which:

Fig. 1 is a diagrammatic illustration, in block form, of the system employed in this invention, and, Fig. 2 is a diagrammatic illustration, partially in block form, showing certain of the parts represented by blocks in Fig. 1 in greater detail.

Fig. 1 shows the essential parts of the electronic dynamometric system comprising a bed plate 11, a motor 12 having a freely rotatable stator and provided with a coupling 13, a displacement-sensitive pickup transformer 14, an electronic amplifier 15, an indicator transformer 16, an integrating and indicating device 16a, and an electrically responsive balancing device 17.

As shown in Fig. 2, the motor 12 has a freely rotatable stator 18, which may be ball-bearing mounted as shown at 18a. Flexible coupling 13 (Fig. 1) or other suitable means is provided for connecting the rotor of the motor 12 to the unit under test. Attached to the freely rotatable stator 18 of the motor 12 is an arm 19 upon which is mounted an armature 20. The displacement sensitive pickup transformer generally designated 14, which may be a conventional E transformer as shown or other suitable type, is responsive to movements of the armature 20 to provide voltages of varying amplitude and phase depending upon the magnitude and direction of the movement of the armature 20. The center arm 21 of the E transformer is connected to a suitable source of power. The other two arms 22 and 23 are wound exactly alike by connected coils 24 and 25. The voltage across the coil on one arm of the E transformer is 180 electrical degrees out of phase with the voltage across the coil on the other arm. When the armature 20 is in the center position the summation of the signal voltage to the amplifier 15 is zero. When the armature 20 moves off center, the signal voltage from one of the coils 24 and 25 is larger than that from the other coil. The resultant voltage is the algebraic sum of the two voltages. The signal voltage from pickup transformer 14 is amplified by follow-up amplifier 15. This is a conventional electronic follow-up amplifier unit of a type similar to that used in follow-up systems of, for example, gyrocompasses. This amplifier unit in response to the signal voltage from the pickup transformer 14 supplies power to solenoid coils 26 and 27 which are disposed about a soft-iron core or armature 28 mounted upon arm 29 attached to the stator 18 of the ball bearing mounted motor 12. If the armature 20 is in the center position, the current sent to the coil 26 is equal and opposite to that sent to the coil 27 and the solenoid core 28 will remain stationary. If the stator housing 18 turns slightly, the armature 20 moves off center and the current sent to one of the coils 26 and 27 will be greater than that sent to the other coil. This causes the solenoid core 28 to move, forcing the stator housing 18 back toward its original position.

The difference in electrical power and current supplied the two solenoid coils 26 and 27 is automatically measured by the integrating and indicating device 16a responsive to signal from transformer 16. This device 16a may be a differential ammeter or wattmeter, or an electronic indicator which will indicate either the average or instantaneous values on a scale which can be either graduated directly in terms of torque, or in units that may be converted into torque values by calibration charts.

For calibration purposes weights may be hung at points on the arms 19 and 29 attached to the stator housing 18 and from the mass and moment arm the actual applied torque can be calculated. From this data and the corresponding meter information, calibration curves can be drawn.

In operation, the device to be tested is mounted on the bedplate 11 and coupled through flexible coupling 13 to the ball-bearing-mounted motor 12.

If the unit to be tested is a motor or driving unit, the ball-bearing motor is used as a generator and the power it generates is dissipated in loading resistors (not shown). (An approximate check on the power can be obtained by measuring the power output and from this and the known efficiency of the ball-bearing motor, when operated as a generator, calculating the power.) The reaction torque developed by the stator of the ball-bearing-mounted motor 12 is indicated upon the indicating instrument 16a and is equal to the torque output of the unit under test.

If the unit to be tested is a driven unit, then the ball-bearing motor 12 is used as a motor and the power to operate it is supplied from external sources. (An approximate check on the power can be made by measuring power demand and from this and the known efficiency of the ball-bearing motor, operated as a motor, calculating the power.) The reaction torque developed by the stator of the ball-bearing motor 12 is indicated by the indicating instrument 16a and is equal to the torque demand of the unit under test.

The reaction torque is measured by measuring the net current and power, or the current or power alone, required to keep the stator 18 in its original position. The reaction torque is automatically balanced by the displacement sensitive pickup transformer 14 controlling the amplifier 15, which in turn varies the current in the solenoid coils 26 and 27 so that the difference is sufficient to produce a torque equal to the reaction torque.

In order to reduce static friction to an insignificant value, the amplifier 15 may be of a type having a hunting action which introduces a small oscillation into the system, so that the system (i. e., motor stator) is not dead beat or static but oscillates continually through a very small amplitude.

The dynamometer of this invention provides an extremely accurate and simple apparatus for determining the power output or demand of a driving or driven unit.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Dynamometric apparatus comprising a motor having a rotor and a freely rotatable stator, means for coupling said rotor to a unit to be tested, a pair of arms mounted on said stator, an armature on one of said arms, electrical displacement-sensitive pickup means responsive to movements of said armature, an electronic amplifier having its input connected to said pickup means and producing normally balanced output currents the relative magnitudes of which are varied in accordance with the magnitude and phase of the input signal, a pair of solenoid coils for receiving electrical energy from said amplifier, said solenoid coils being adapted to be unequally energized by said amplified energy to provide a net current of magnitude and sense corresponding to the magnitude and direction of the displacement of said armature from a null position, a solenoid core mounted on the other of said arms and disposed within the said solenoid coils, whereby said core is displaced in accordance with said net current to balance the reaction torque developed by the said freely rotatable stator, and means responsive to the electrical energy supplied by said amplifier to indicate the required balancing power.

2. A dynamometer comprising a motor having a rotor and a freely rotatable stator, means for coupling the unit to be tested to said rotor, displacement-sensitive pickup means responsive to displacement of said stator, an amplifier having its input connected to said pickup means and producing normally balanced output currents the relative magnitudes of which are varied in accordance with the magnitude and phase of the input signal, and a force-balancing device connected electrically to the amplifier output and connected operatively to said stator and differentially responsive to said output currents to balance the displacement of said stator.

3. A dynamometric system comprising a dynamoelectric machine having a rotor and a freely rotatable stator, means for coupling a unit to be tested to said rotor, displacement-sensitive pickup means responsive to displacement of said stator to provide electrical signals, electronic amplifying means having its input connected to said pickup means and producing normally balanced output currents the relative magnitudes of which are varied in accordance with the magnitude and phase of the input signal, a force-balancing device including differentially-wound relay means connected operatively to said stator and responsive to said output currents to minimize the displacement of said stator, and means for measuring the balancing power.

4. Dynamometeric apparatus comprising a dynamoelectric machine having at least two parts capable of rotative movement, the rotation of one part being a measure of the reaction torque relative to the rotation of the other part, one said part being adapted for coupling to a source of power to be measured, means responsive to displacement of said other part from a predetermined condition for producing normally balanced output currents the relative magnitudes of which are varied in accordance with the magnitude and phase of the input signal, and a force-balancing device connected electrically to said means and connected operatively to said other part and differentially responsive to said output currents for producing a displacement of said other part equal and opposite to said first-mentioned displacement thereby to minimize the same.

5. The apparatus as in claim 4 wherein the force-balancing device comprises a pair of windings connected in bucking relation and adapted normally for unequal energization by said output currents.

BERNARD J. BAECHER.

REFERENCES CITED

The following references are of record in the file of this patent:

UNITED STATES PATENTS

| Number | Name | Date |
|---|---|---|
| 1,600,071 | Shaifer | Sept. 14, 1926 |
| 1,921,983 | Wittkuhns | Aug. 8, 1933 |
| 1,953,819 | Payne | Apr. 3, 1934 |
| 2,088,659 | Moseley | Aug. 3, 1937 |
| 2,117,894 | Lenehan | May 17, 1938 |
| 2,141,175 | Dawson | Dec. 27, 1938 |
| 2,360,751 | Ziebolz | Oct. 17, 1944 |
| 2,371,040 | Fisher et al. | Mar. 6, 1945 |

FOREIGN PATENTS

| Number | Country | Date |
|---|---|---|
| 387,728 | France | May 13, 1908 |